July 22, 1958 — C. E. BRICKER ET AL — 2,844,224

AUTOMATIC BRAKE ADJUSTMENT DEVICE

Filed Nov. 2, 1955

*INVENTOR.*
CARL E. BRICKER
ALBERT W. COOK

BY *R. L. Miller*
ATTORNEY

United States Patent Office 2,844,224
Patented July 22, 1958

2,844,224

AUTOMATIC BRAKE ADJUSTMENT DEVICE

Carl E. Bricker and Albert W. Cook, Akron, Ohio, assignors to The Goodyear Tire & Rubber Company, Akron, Ohio, a corporation of Ohio Application November 2, 1955, Serial No. 544,407

9 Claims. (Cl. 188—73)

This invention relates to brakes, and especially to brakes and brake housing means wherein the brake housings may deflect or distort slightly under braking conditions and/or wherein a brake disc is provided in the brake means and through use becomes slightly bent out of a true flat or planar shape. The automatic adjustment device of the invention relates to a deflection compensation means built into the brake to insure desirable brake operation and complete brake release at all times.

Various types of brakes, such as most of those used on aircraft, include one or more rotating discs to which braking forces are applied by brake block means positioned in the brake housing for effecting braking action on both sides of the brake disc which is positioned on and rotates with the aircraft wheel. The brake means are held in operative position by sturdy but usually relatively light weight housings even though large braking forces are applied to the discs for effecting braking action thereon. By the application of braking forces to the aircraft brakes, the portions of the brake housing on opposite sides of the rotating disc are urged apart slightly and they spring back to their original positions upon brake release.

It also has been observed that in many instances the brake discs provided in brakes of the above-identified type do not remain absolutely flat after periods of use but frequently assume a slightly wavy and/or conical shape. Thus braking forces applied to such brake discs usually must first flatten the brake discs before effective braking action can be secured. The braking forces are produced by axial movement of piston means provided in the brake, which piston means urge the brake lining means towards the brake disc for braking engagement therewith. To overcome the springing apart action on the housing, to flatten an improperly shaped brake disc, and to take up the brake clearance, the piston means must have relatively great axial movement in the brake assembly and, desirably, the piston means should be returned to its starting position upon release of the brake actuating means so that proper operating clearances and complete brake release are provided in the brake.

Aircraft brakes of the types referred to are in many instances provided with an automatic adjustment or wear piston as shown in U. S. Patent No. 2,392,970. This adjustment piston controls the position of the brake lining positioning means in the brake upon brake release but permits movement of the brake lining positioning means towards the brake disc as wear occurs in the brake lining so that a constant operative clearance can be provided in the brakes even after appreciable brake lining wear. The automatic adjustment pistons provided heretofore have worked effectively for controlling movement of the brake lining means towards a brake disc as wear occurs, but it has been noted that the adjustment piston may have in some instances limited the return or clearance position of the brake lining positioning means in the brake because of other movement of brake components during braking section. Hence a "drag" may remain upon the brake even though the brake is completely released.

The general object of the present invention is to overcome and avoid the foregoing conditions in brakes and to provide a new and improved brake having an automatic brake adjustment device built therein for insuring complete release of a brake under all normal operative conditions.

Another object of the invention is to provide some type of a special seal means between an automatic adjustment piston in the brake and the brake lining positioning piston in which the adjustment piston is slidably received so that any forces built up in a brake housing and/or brake disc by brake application can be effectively transmitted back to the automatic adjustment piston upon brake release.

A further object of the invention is to provide a resilient seal member on an automatic adjustment piston in a hydraulic brake wherein such seal becomes operative to seal on the brake lining positioning piston upon brake release and make a unit of the brake lining positioning piston and the adjustment piston by hydraulic fluid trapped therebetween.

Yet another object of the invention is to provide uncomplicated but automatic seal means in a brake of the type referred to wherein the seal is operative only for a short time immediately following brake actuation for applying any drag or deflection forces built up in the brake upon brake operation to the adjustment piston of the brake assembly when the brake is inoperative.

The foregoing and other objects and advantages of the invention will become more apparent as the specification proceeds.

Reference now is directed to the accompanying drawings which illustrate one currently known and presently preferred embodiment of the invention in detail, and wherein.

Figure 1:
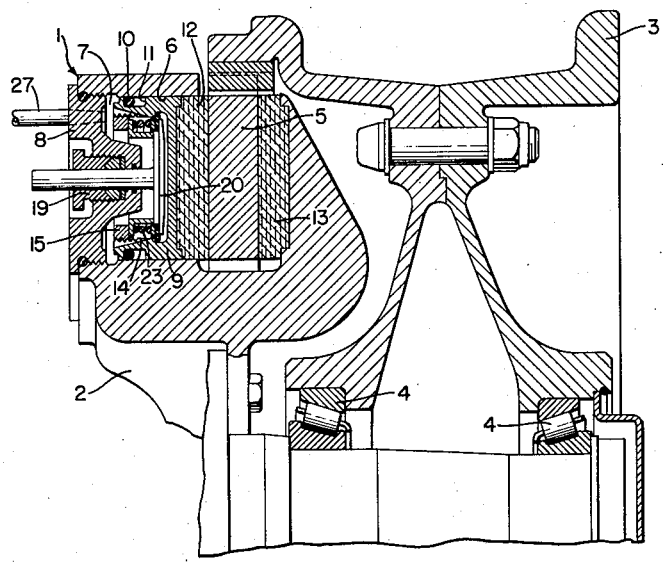
Fig. 1 is a fragmentary vertical section of a brake having brake actuation means and automatic brake adjustment devices of the invention associated therewith.

The invention relates to a brake including a brake housing having a cylinder therein, a piston slidably received in the cylinder, a brake disc, brake lining means secured to the piston for engaging a brake disc for braking action thereon, an adjustment pin slidably positioned within the piston, hydraulic pressure means connecting to the cylinder to effect braking movement of the piston by flow of hydraulic fluid into and against the piston and around the adjustment pin, means for restraining movement of the adjustment pin axially, means between the piston and adjustment pin for sealing action therebetween upon brake release to form an enclosed fluid-receiving chamber intermediate the piston and adjustment pin, and means for slowly releasing the fluid trapped in such chamber.

While the present invention relates to and can be used with any desired type of a brake it is shown in conjunction with an aircraft wheel brake.

When referring to corresponding parts shown in the drawings and described in the sepcification, corresponding numerals are used to facilitate comparison between such similar parts in the drawings and specification.

Attention now is directed to the details of the structure shown in the accompanying drawings, and a brake is shown and indicated as a whole by the numeral 1. The brake 1 includes a brake housing 2 of any desired shape secured by conventional means to a hub or other member on an axle on which a wheel 3 is journalled as by bearings 4. A brake disc 5 is carried by the wheel 3 by conventional splined engagement therewith for movement along the wheel axis as is usual in brakes of this type. The drawings clearly show that the housing 2 has components positioned adjacent opposite sides of this brake disc 5 for effecting braking action thereon as described hereinafter in detail.

The brake housing 2 is provided with conventional hydraulic brake means in association therewith and one or more cylinders 6, as desired, are provided in the brake housing 2, which cylinder 6 has a longitudinal axis extending parallel to the axis of the wheel 3 and spaced radially therefrom. A hydraulic fluid receiving chamber 7 is provided in the cylinder 6 by a suitable end cap 8 in engagement with the brake housing 2 and sealed thereto by conventional gasket means. A brake piston 9 is in slidable engagement with the cylinder 6 and is sealed with relation thereto by a conventional O-ring 10 carried in a recess 11 in the periphery of the piston 9. The piston 9 is used to position brake lining means thereon and a standard brake lining block 12 is shown secured to the piston 9 whereas a second brake lining block 13 is carried by the brake housing 2 adjacent the opposite side of the brake disc 5, as shown in Fig. 1 of the drawings. The brake piston 9 may be considered to be a hollow piston but in all events it has a relatively long recess or bore 14 provided therein from one end thereof and a carrier or pusher ring 15 is in threaded engagement with such end of the recess 14. This base ring 15 is used as a base for a spacer sleeve 16 through a flange 17 provided on one end of the spacer sleeve 16 seating on the base ring 15.

Figure 2:
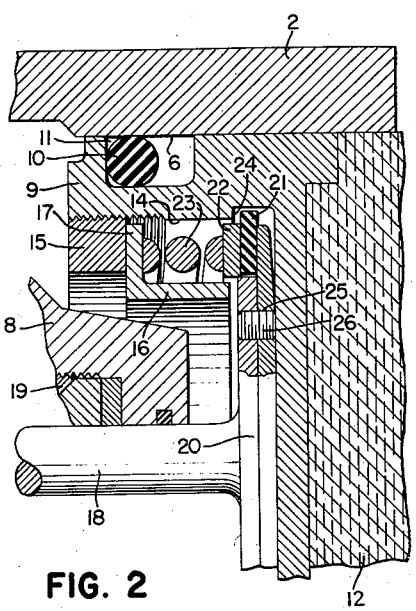
Fig. 2 is an enlarged detail of the automatic adjustment pin and controls therefor of the brake of Fig. 1, with the brake being shown in inoperative, clearance position.

An automatic adjustment pin of the type disclosed in the aforementioned Patent No. 2,392,970 is provided, and such adjustment pin or piston 18 extends through the end cap 8 but is secured thereto by suitable friction means or other similar member 19 associated therewith for restraining axial movement of the adjustment pin 18 until the restraining force set up by such friction means 19 is overcome by forces otherwise applied to the adjustment pin 18. It will be seen that the adjustment pin 18 is positioned on the axis of the brake piston 9 and preferably such adjustment pin 18 has a head 20 thereon normally positioned adjacent the inner end of the recess 14 and of substantially the same diameter as such recess. When the brake 1 is released, clearance is provided between such head 20 and the spacer sleeve 16, as shown in Fig. 2, but the sleeve engages the head on brake operation. The construction and relationship of the chamber 7, brake piston 9, spacer sleeve 16 and adjusting pin 18 is such that hydraulic fluid forced into such chamber 7 by conventional brake actuating means (not shown) exerts forces against the piston 9 and flows into the recess or bore 14 and around the adjusting pin 18 and the head 20 thereof. Hence the piston 9 will be forced axially towards the wheel 3. After the clearance between the axially inner end of the spacer sleeve 16 and the head 20 is eliminated by piston movement, then the piston 9 will force the adjusting pin 18 to move axially in the brake assembly so that unitary movement of the piston and adjusting pin will be effected should further actual movement of the piston 9 be necessary in order to produce effective braking action upon the brake disc 5. It will be realized that the piston 9 must force the brake disc 5 against the brake lining block 13 and the brake lining block 12 against the brake disc for brake action.

Figure 3:
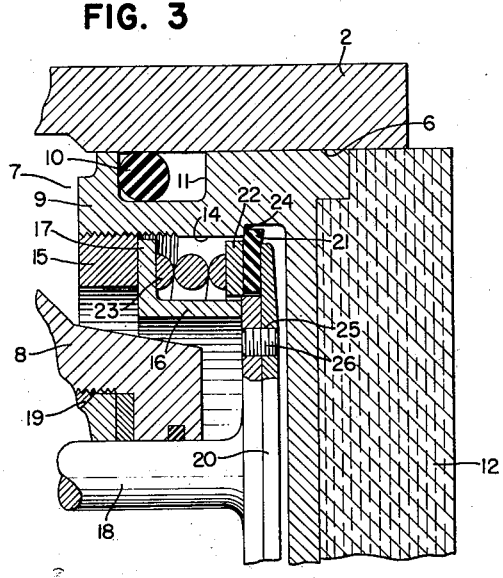
Fig. 3 is a fragmentary section of like Fig. 2 with the brake means being shown in brake applied position at the instant of brake release.

As an important feature of the invention, special seal means or gaskets are provided in the brake 1 of the invention and these means are adapted to provide temporary seals intermediate the head 20 of the adjustment pin 18 and the bore or recess 14 provided in the brake piston 9 so that hydraulic fluid initially flowing between the closed inner end of the bore in the piston 9 and the head 20 will be trapped therein to provide for temporary unitary return movement of the brake piston and adjustment pin, as described hereinafter in more detail. This insures complete release of the brake when it is not actuated. To this end, a flat resilient sealing ring or gasket 21 is provided. This sealing ring 21 is carried on the axially outer face of the adjustment pin head 20 and is shown retained in position thereon by a washer 22. Washer 22 is urged against the sealing ring 21 by a spring 23 carried by the spacer sleeve 16 with one end based on the flange 17 on the spacer sleeve 16. The spring 23 is retained compressed against the adjustment pin head 20 to retain the washer 22 and sealing ring 21 in their proper positions. It should be noted that the sealing ring 21 protrudes radially beyond its positioning means, and in one position, seats against a shoulder 24 provided at the axially inner end of the recess 14 in the brake piston 9, as shown in Fig. 3.

Fig. 2 of the drawings illustrates how hydraulic fluid will flow around the sealing ring periphery upon braking movement in the brake assembly. However, at the instant that braking pressure is released, and when the piston 9 and associated means are in the braking position as shown in Fig. 3, a quantity of fluid will be trapped in a chamber formed by the sealing ring 21 seating on the shoulder 24 and enclosing such fluid between adjacent portions of the head 20 and the inner end of the piston 9. Hence any axial movement of the piston 9 required to produce braking action because of the springing apart of the portions of the housing 2 on opposite sides of the brake disc 2, or which movement is required to flatten the brake disc 5 for braking action thereon, and the forces set up in the housing 2 and/or brake disc 5, will be effectively transmitted through the brake piston 9 back to the adjustment pin 18. Such forces will move the adjustment pin axially outwardly of the brake assembly to remove any possible "drag" on the brake disc 5 when the brake is released. The brake 1 thus has the novel characteristic of moving the adjustment pin 18 in one direction for braking action and in the opposite direction upon brake release.

In order to permit the spring 23 ultimately to provide operative clearance in the brake 1, preferably some type of bleeding means are provided for slowly permitting flow of entrapped fluid from the chamber initially provided by the seal ring 21 upon brake release. Thus in this embodiment of the invention, a tapped hole 25 is provided in the head 20 and a set or filler screw 26 is positioned therein so that fluid can slowly leak through the threads provided between the hole 25 and screw 26. It will be realized that the return or springing action on the housing 2 will occur substantially instantaneously upon brake release so that no permanent sealing action need be effected by the ring 21.

A hydraulic pressure supply conduit 27 suitably connects to the chamber 7 for supply of liquid under pressure thereto from the conventional brake actuation means (not shown) to which the conduit connects.

It should be noted that a very small bleed hole may be provided through the head 20, if desired and release the trapped liquid.

In making the seal ring 21, it should be realized that this seal ring may be carried either by the piston 9, or by the head of the adjustment pin, as desired. Of course, the sealing ring also may be provided in other shapes as long as the required temporary sealing action is produced.

The spring 23 will move the piston 9 axially outwardly of the brake for further brake clearance when no further return forces are applied to the unit made from the adjustment pin 18 and piston 9.

In view of the foregoing, it will be seen that an effective but temporary seal action has been provided for maintaining a unitary relation between the adjustment pin and the brake lining positioning piston so that forces otherwise tending to set up a drag on the brake will be effectively transmitted to the adjustment pin to permit further withdrawal of the brake lining carrying piston in the brake assembly. Thus a completely released clearance condition can be established in the brake 1 under brake release conditions even though relatively long travel of the piston 9 and adjustment pin 18 are required to produce brake action. Hence it is submitted that the objects of the invention are achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In combination in a brake, a brake disc, a brake housing, said housing having a cylinder therein, a hollow piston slidably positioned in said cylinder, brake block means on said piston for braking contact with said brake disc, an adjustment pin, friction gripping means on said housing engaging said pin for retarding axial movement of said pin, head means on said pin extending into said piston, spring means based against said head means within said piston for urging said piston and brake block means to inoperative position, means for supplying hydraulic pressure to and within said piston to move said piston for brake action, and a resilient sealing ring between said head means and said piston and mounted upon one of them for engagement with the other to form a seal therebetween to trap hydraulic fluid between said head and said piston when the actuation of the hydraulic pressure supply means is terminated.

2. In a brake, a brake housing having a cylinder therein, a piston slidably received in said cylinder, a brake disc, brake lining means secured to said piston for engaging said brake disc for braking action thereon, an adjustment pin slidably positioned within said piston for axial movement independent of said piston, hydraulic pressure means connected to said cylinder to effect braking movement of said piston by flow of fluid into and against said piston, friction gripping means for restraining movement of said adjustment pin, a resilient seal ring extending between said piston and adjustment pin upon one of them for engagement with the other for temporary sealing action therebetween upon brake release to trap hydraulic fluid between said adjustment pin and said piston, and a spring compressed between said piston and adjustment pin to hold said seal ring against said adjustment pin and to move said piston to no-load clearance position in the brake.

3. In a brake, a brake housing having a cylinder therein, a piston member slidably received in said cylinder, a brake disc, brake lining means secured to said piston member for engaging said brake disc for braking action thereon, an adjustment pin member slidably positioned within said piston, hydraulic pressure means connected to said cylinder to effect braking movement of said piston member by flow of fluid into and against said piston member, friction gripping means for restraining movement of said adjustment pin member, and seal means between said piston member and adjustment pin member for temporary sealing action therebetween upon brake release to trap hydraulic fluid between such members and permit axial movement of said pin member by force applied to said piston member, one of said members having a shoulder thereon and said seal means being carried by the other of said members to seal against said shoulder upon brake release.

4. In combination in a brake, a brake disc, a brake housing, said housing having a cylinder therein, a piston slidably positioned in said cylinder, brake block means on said piston for braking contact with said brake disc, an adjustment piston extending into and spaced axially from said first-named piston, means including a friction grip for retarding axial movement of said adjustment piston, spring means for urging said first-named piston and brake block means to inoperative position, means for supplying hydraulic fluid under pressure to said first-named piston to move it for brake action and to supply fluid intermediate said pistons, and a flexible sealing ring positioned between said first-named piston and said adjustment piston to form a seal therebetween when the actuation of the hydraulic pressure supply means is terminated to trap hydraulic fluid between the pistons, said sealing ring being mounted on one of said pistons for sealing engagement with the other.

5. In a brake, an outer piston, means for effecting brake action, an adjustment pin slidably received in said outer piston for movement along the axis thereof and having a head within said piston and spaced therefrom axially between shoulders of said piston friction grip, means for retarding movement of said adjustment pin along its axis, hydraulic fluid being supplied for moving said piston to operative position, the hydraulic fluid supplied for braking action flowing into said piston and around the head of said adjustment pin, and means for forming a seal between said piston and said adjustment pin when said piston is released from its braking position whereby hydraulic fluid is trapped between the outer piston and the head of said adjustment pin so that forces applied to said outer piston after actuation thereof are transmitted to said adjustment pin.

6. In a brake, a piston, means for effecting brake action, an adjustment pin slidably received in said piston for movement along the axis thereof and having a head within said piston spaced axially therefrom by shoulders of said piston, hydraulic means for moving fluid against said piston to force it to its operative position independent of movement of said adjustment pin, such fluid flowing in between said piston and adjustment pin, means for forming a seal between said piston and said adjustment pin when said piston is operatively positioned to trap fluid therebetween whereby forces applied to said outer piston after actuation thereof are transmitted to said adjustment pin, and means for bleeding such trapped fluid slowly from between the sealed portions of said piston and adjustment pin.

7. In a brake, a brake housing having a cylinder therein, a piston slidably received in said cylinder, a brake disc, brake lining means secured to said piston for engaging said brake disc for braking action thereon, an adjustment pin slidably positioned within said piston for axial movement independent of said piston, hydraulic pressure means connected to said cylinder to effect braking movement of said piston by flow of fluid into and against said piston and around said adjustment pin, friction grip means for restraining movement of said adjustment pin, means between said piston and adjustment pin for sealing action therebetween upon brake release to provide an enclosed fluid filled chamber intermediate said piston and adjustment pin to provide a fluid strut therebetween, and means for slowly releasing fluid from said chamber.

8. In a brake, a piston, an adjustment pin slidably mounted within said piston for independent movement along the axis thereof, said piston being movable to operative position by hydraulic means, and means including a flange on said pin extending between but spaced axially from shoulders of said piston for forming a seal between said piston and said adjustment pin to make a unit therefrom immediately after said piston has been operatively positioned whereby forces applied to said outer piston after actuation thereof are transmitted to said adjustment pin.

9. In a brake, a piston, an adjustment pin slidably mounted within said piston for independent movement along the axis thereof, said piston being movable to operative position by hydraulic means, means normally restraining said adjustment pin against axial movement, means including a flange of said adjusting pin located between and spaced from shoulders of said piston and engageable thereby for forming a seal between said piston and said adjustment pin to make a unit therefrom immediately after said piston has been operatively positioned whereby forces applied to said outer piston after actuation thereof are transmitted to said adjustment pin, and means for slowly bleeding fluid from between said piston and said adjustment pin.

References Cited in the file of this patent

UNITED STATES PATENTS

| | | |
|---|---|---|
| 1,097,286 | Baker | May 19, 1914 |
| 2,644,549 | Cagle | July 7, 1953 |
| 2,657,773 | Driscoll | Nov. 3, 1953 |